(12) United States Patent
Suzuki

(10) Patent No.: US 7,366,061 B2
(45) Date of Patent: Apr. 29, 2008

(54) INFORMATION RECORDING APPARATUS, INFORMATION REPRODUCING APPARATUS, AND METHOD AND SYSTEM FOR RECORDING AND REPRODUCING INFORMATION IN A PLURALITY OF LEVELS OF RECORDING UNITS

(75) Inventor: Ryoichi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 508 days.

(21) Appl. No.: 10/445,857

(22) Filed: May 28, 2003

(65) Prior Publication Data

US 2003/0231559 A1 Dec. 18, 2003

(30) Foreign Application Priority Data

Jun. 17, 2002 (JP) .............................. 2002-176179

(51) Int. Cl.
*G11B 21/08* (2006.01)
(52) U.S. Cl. .................................... 369/30.11
(58) Field of Classification Search ..................... None
See application file for complete search history.

(56) References Cited

U.S. PATENT DOCUMENTS

| 5,722,029 | A | 2/1998 | Tomidokoro et al. |
| 6,507,412 | B1 | 1/2003 | Suzuki et al. |
| 6,631,107 | B1 | 10/2003 | Ito et al. |
| 6,728,186 | B2 * | 4/2004 | Weijenbergh et al. ... 369/59.25 |
| 6,918,003 | B2 * | 7/2005 | Sasaki ........................ 711/112 |
| 7,016,289 | B2 * | 3/2006 | Sasaki ..................... 369/59.25 |
| 7,016,293 | B2 * | 3/2006 | Lee .......................... 369/275.3 |
| 7,050,384 | B2 * | 5/2006 | Sasaki ..................... 369/275.3 |
| 7,082,092 | B2 * | 7/2006 | Weijenbergh et al. ... 369/59.25 |
| 7,149,172 | B2 * | 12/2006 | Ohhashi ................... 369/59.25 |
| 2002/0012298 | A1 | 1/2002 | Suzuki |
| 2002/0024902 | A1 * | 2/2002 | Sasaki ....................... 369/47.39 |
| 2002/0105862 | A1 * | 8/2002 | Lee .......................... 369/30.05 |
| 2002/0114245 | A1 * | 8/2002 | Sasaki ....................... 369/53.37 |
| 2002/0159353 | A1 * | 10/2002 | Sasaki ....................... 369/53.15 |
| 2002/0181376 | A1 * | 12/2002 | Acker ...................... 369/59.25 |
| 2003/0033475 | A1 * | 2/2003 | Sasaki ......................... 711/112 |
| 2003/0059205 | A1 | 3/2003 | Suzuki |

(Continued)

FOREIGN PATENT DOCUMENTS

JP 10-334563 12/1998

(Continued)

*Primary Examiner*—Tan Dinh
(74) *Attorney, Agent, or Firm*—Dickstein Shapiro LLP

(57) ABSTRACT

High speed access to an information recording medium is possible by preparing information relative to a lower level recording unit, e.g., a fragment, which is set smaller than a higher level recording unit, e.g., a session. A fragment identifier, typically, a fragment number is assigned to each fragment, sequentially and in ascending order. A fragment number (greatest fragment number) that is greater than any other fragment number in the session is recorded in the information recording medium for each session. When reproducing a desired fragment, a controller acquires the greatest fragment number of each session sequentially from the first session, and compares the greatest fragment number of the session with the fragment number of the desired fragment. When the greatest fragment number that is equal to or greater than the fragment number of the desired fragment is found, the desired fragment is searched for from the top of the session.

10 Claims, 5 Drawing Sheets

ADDRESS →

| SESSION-1 | SESSION-2 | SESSION-3 | FIRST RECORDING UNIT |
|---|---|---|---|
| | | | |

| F1 | F2 | F3 | F4 | F5 | F6 | F7 | SECOND RECORDING UNIT |
|---|---|---|---|---|---|---|---|

U.S. PATENT DOCUMENTS

2003/0063545 A1   4/2003   Suzuki
2003/0072014 A1   4/2003   Suzuki et al.
2006/0280087 A1*  12/2006  Lai et al. ................ 369/53.24

FOREIGN PATENT DOCUMENTS

| JP | 2000-090650 |   | 3/2000 |              |
|----|-------------|---|--------|--------------|
| JP | 2001-52352  |   | 2/2001 |              |
| JP | 2002-50157  |   | 2/2002 |              |
| JP | 2002-117649 |   | 4/2002 |              |
| JP | 2003-208779 | * | 7/2003 | ............... 369/47.14 |

* cited by examiner

FIG.2

ADDRESS →

| SESSION-1 | | | SESSION-2 | | | SESSION-3 | FIRST RECORDING UNIT |
|---|---|---|---|---|---|---|---|
| F1 | F2 | F3 | F4 | F5 | F6 | F7 | SECOND RECORDING UNIT |

INFORMATION RECORDING APPARATUS, INFORMATION REPRODUCING APPARATUS, AND METHOD AND SYSTEM FOR RECORDING AND REPRODUCING INFORMATION IN A PLURALITY OF LEVELS OF RECORDING UNITS

BACKGROUND OF THE INVENTION

1. Field of the Invention

The present invention generally relates to an information recording/reproducing system that consists of an information recording apparatus for recording data on an information recording medium, which is exchangeable mainly in a computer system, such as an optical disk (CD-R/RW, DVD-R/RW, DVD+R, DVD+RW), a magneto-optical disk (MO), a magnetic disk (HD, FD, LS120, ZIP), and a memory card (RAM, ROM); an information reproducing apparatus for reproducing the data recorded on the information recording medium by the information recording apparatus; an information recording method for recording the data on the information recording medium; a program for a computer to execute an information recording process; a computer-readable recording medium for storing the program; a host computer; and an information recording/reproducing system for recording the data on the information recording medium according to directions from the host computer.

2. Description of the Related Art

As computers and digital apparatuses become indispensable to businesses and everyday life, there is a growing requirement for information recording media to become versatile, and, among other things, compatibility and perpetuity are often considered important. Especially, magnetic recording media and optical recording media are attracting attention, because they are easy to handle. As the recording density of these media is increasing, and the amount of data to be recorded and reproduced is becoming greater, the capability to handle the data in smaller units than is allowed by conventional methods is required for a finer control of recording and reproduction. However, the recording units and reproducing units are considerably different from apparatus to apparatus, and from medium to medium.

In the case of the CD-R disk, for example, only the disk-at-once (whereby data recording is performed on the entire disk from start to end in one operation) was available as a data recording method in the beginning. Since then, data recording methods based on smaller units have been developed, step by step, namely, data recording units based on units of sessions, tracks, and packets are presently available. In response to these developments, a process for reproducing a desired section of the data has been such that the desired section position is determined by checking the recording units from the largest unit to the smallest unit, one by one. This process clearly slows the reproducing performance, especially in a system with a slow random access capability. In the case of a music CD that is a typical optical information recording medium, the start position and the end position of each music piece are recorded in a certain zone at the inner circumference of the disk for facilitating search for the positions. In this manner, a desired music piece is easily located.

Further, there is another method for facilitating the search, wherein necessary information is embedded in the information recording medium, the embedded information including address information, and information about rotational control; and the information is retrieved when reproduction is to be carried out (for example, refer to JP,2001-52352,A).

Further, when searching for a position of desired data in a recordable information recording medium, such as a DVD+R disk, the data position of the desired data is searched for using a larger unit, even though the data position can be determined on a smaller recording unit basis. For example, when searching for fragment information (data position) of target data on the DVD+R disk, access is made to a session disk control block (SDCB) that stores management information for each session until the position of the target data is determined, the SDCB being recorded in the lead-in part of the innermost circumference of the recordable information recording medium.

PROBLEMS TO BE SOLVED BY THE INVENTION

However, searching for the data position of the desired record through all the levels of the recording units is time consuming. This problem becomes even remarkable when data recording is available on a smaller unit basis, e.g., on a fragment unit basis, and when the logical structure of the information recording medium becomes complicated. At present, recording may be carried out on a packet basis and a fragment basis; however, such reproducing does not enjoy swift access to the desired data, since recording/reproducing in the small units was not conceived in the beginning.

Recently, high-speed network services have become available. and it is often the case that information that is cached on the network is retrievable faster than locally setting and accessing an information recording medium due to time required for the information medium to be made ready. Accordingly, it is required that elapsed time between setting and ready-to-serve of the information recording medium be shortened.

SUMMARY OF THE INVENTION

It is a general object of the present invention to provide an information recording apparatus, an information reproducing apparatus, (the preceding two items combined are also referred to as an information recording/reproducing apparatus), an information recording method, a program, a recording medium, and an information recording/reproducing system that substantially obviate one or more of the problems caused by the limitations and disadvantages of the related art.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by an information recording apparatus, an information reproducing apparatus, an information recording method, a program, a recording medium, and an information recording/reproducing system, particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides high-speed access to a desired section of the information recording medium by preparing a smaller recording unit, e.g., a fragment, in a larger recording unit, e.g., a session, when recording data on the information recording medium; and by reading information relative to the smaller recording unit, when reproducing.

BRIEF DESCRIPTION OF THE DRAWINGS

FIG. 2 is a diagram for explaining a format of data recording of the information recording/reproducing system shown in FIG. 1;

DESCRIPTION OF THE PREFERRED EMBODIMENTS

In the following, embodiments of the present invention will be described with reference to the accompanying drawings.

Figure 1:
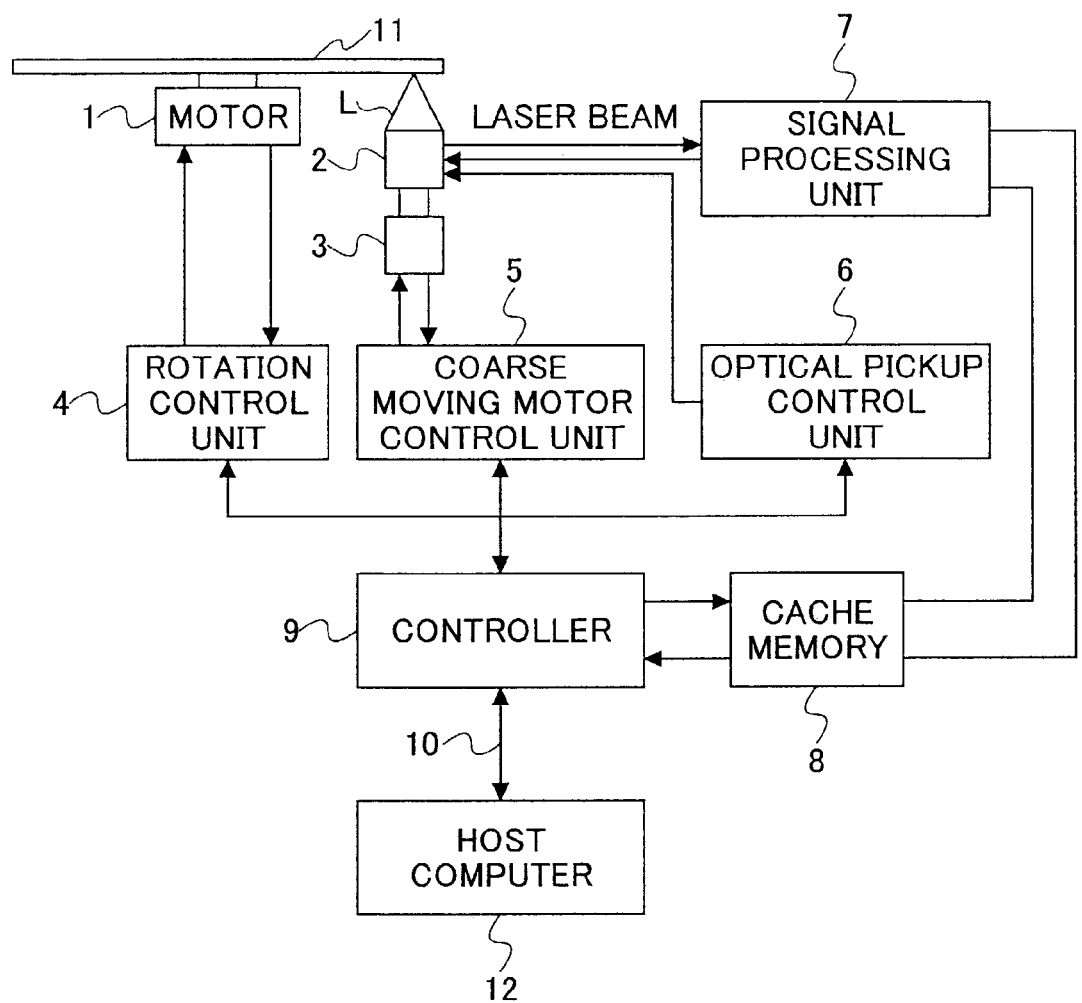
FIG. 1 is a block diagram showing a configuration of an information recording/reproducing system, using an optical disk, according to an embodiment of the present invention.

FIG. 1 is a block diagram showing the configuration of the information recording/reproducing system, using an optical disk, according to an embodiment of the present invention. The information recording/reproducing system includes an optical disk drive (information recording/reproducing apparatus) and a host computer 12. The information recording/ reproducing system records data on an optical disk 11 mounted on the optical disk drive, and reproduces the recorded data from the optical disk. The optical disk 11 may be one of a write-once type, a rewritable type, and a stamped ROM medium. In the following, the present embodiment will be described, taking a DVD+R disk as an example.

The optical disk drive includes a motor 1 for rotating the optical disk 11, a rotational control unit 4 for controlling the rotation of the motor 1, an optical pickup 2 for irradiating a laser light L to the optical disk 11 for recording and reproducing data, an optical pickup control unit 6 for controlling luminance of the laser light L, a positioner (tracking motor) 3 for moving the optical pickup 2 in the radius directions of the optical disk 11, a positioner (tracking motor) control unit 5 for controlling the rotational drive of the positioner (tracking motor) 3, a signal processing unit 7 for controlling a signal to and from the optical pickup 2, a controller 9 for controlling the entiree disk drive, a host computer 12, and an external interface 10 for exchanging signals between the controller 9 and the host computer 12 via ATAPI, SCSI, IEEE 1394, USB, and the like. The optical disk drive further includes a signal processing unit 7, and a cache memory 8, which are described below Although illustration is omitted, the controller 9 is equipped with a CPU, a register, a program for operating the controller 9, and a non-volatile RAM containing a zone for storing various kinds of information. The controller 9 uses the cache memory 8 for temporarily storing data. The host computer 12 includes a microcomputer that further includes a CPU, ROM such as flash ROM (FROM), RAM, and the like. Recording and reproducing of data to and from the optical disk 11 are carried out by a CPU executing the program stored in ROM.

Namely, the program for executing the data recording process according to the present invention is installed in the non-volatile RAM of the controller 9. The information recording method according to the present invention is carried out by the controller 9 executing the program. According to the present invention, when recording the data on a recordable information recording medium, a plurality of levels of recording units are used. A recording unit that is greater than any other recording unit is referred to as the largest recording unit, that is, the highest level recording unit, and typically is called a session. Recording units other than the largest recording unit are referred to as smaller recording units, and include a fragment. Each of the smaller recording units, e.g., a fragment, in each of the largest recording units, e.g., a session, is assigned a unique serial number in ascending order. When completing recording on the basis of the largest recording units, the fragment serial number that is greater than any other serial number in a session is recorded by the program of the controller 9, which is referred to as a greatest number recording means. Alternatively, when completing recording on the basis of the largest recording units, a serial number that is smaller than any other serial number in a session is recorded by the program of the controller 9, which is referred to as a smallest number recording means.

Further, the optical disk drive functions as an information reproducing apparatus that searches for the data recorded on the optical disk 11. Namely, the program for executing a data reproducing process according to the present invention is stored in the non-volatile RAM of the controller 9. The information reproducing method according to the present invention is executed by the controller 9 executing the program. When reproducing the data of the information recording medium that is completed as mentioned above, the controller 9 executes the program for searching for desired data based on the greatest serial number, or alternatively the smallest serial number, of the smaller recording units (e.g., a fragment) contained in the largest recording unit (e.g., a session). This serves as a searching means based on the greatest number, and a searching means based on the smallest number, respectively.

Alternatively, the program for performing the process according to the present invention is installed in the host computer 12, instead of the controller 9. Then, the host computer 12 executes the program for carrying out the information recording, and searching for the desired data for reproducing the desired data recorded on the optical disk 11. The program can be stored on various kinds of computer-readable recording media, such as an optical disk, a flexible disk, and a magneto-optical disk. Further, if the host computer 12 is connected to a network, the program may be downloaded from the network and installed in the host computer 12.

Figure 2:
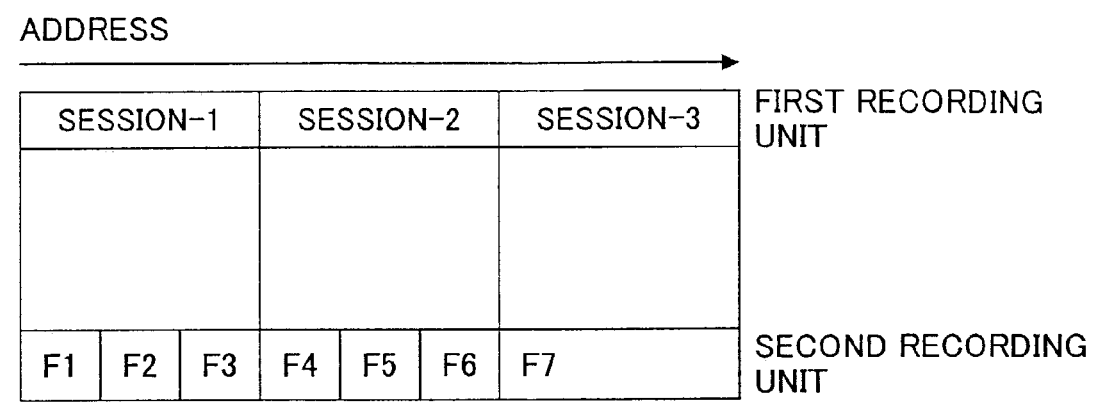

Next, the recording format of the information recording/ reproducing system, using an optical disk, is explained. FIG. 2 is a diagram for explaining the recording format of the information recording/reproducing system. Here, an example of the case where the optical disk 11 is a DVD+R disk (disk recorded in the data recording format of DVD+R as specified in the standard document) is explained. Further, in the example, the number of the levels of recording units is set at two, namely, a session unit that is the largest recording unit provided, and a fragment unit that is a recording unit smaller than the session unit. Data are recorded on the optical disk 11 by a first recording unit that is the session unit (the largest recording unit), and a second recording unit that is the fragment unit (the smaller recording unit). In other words, a session is subdivided into one or more fragments. All the fragments are serially numbered in ascending order. FIG. 2 shows the case where session-1 contains fragments F1, F2, and F3; session-2 contains fragments F4, F5, and F6; and session-3 contains the same content as session-1, but only one fragment F7 is defined.

When data recording of session-1 is completed, fragment number F3, which is greater than any other fragment numbers in session-1, namely, F1 and F2, is attached as management information to session-2. Similarly, when completing recording of data of session-2, the greatest number F6 of the serial numbers F4, F5, and F6 within session-2 is attached as management information to session-3. Further, when completing recording of data of session-3, which consists of only one fragment, the number F7 is attached as management information to session-4 (illustration omitted), and so on. The management information for each session is recorded in zones before and after the session, and in a zone that manages the entire optical disk.

Alternatively, the smallest number, instead of the greatest number, may be attached as management information to the subsequent session. Specifically, when completing data recording of session-1, the smallest fragment number F1 of the serial numbers F1, F2, and F3 in session-1 is attached as management information to session-2. Similarly, when completing the data recording of session-2, the smallest fragment number F4 of the serial numbers F4, F5, and F6 in session-2 is attached as management information to session-3. Further, the smallest fragment number F7 of session-3 is attached as management information to session-4, and so on.

Figure 3:
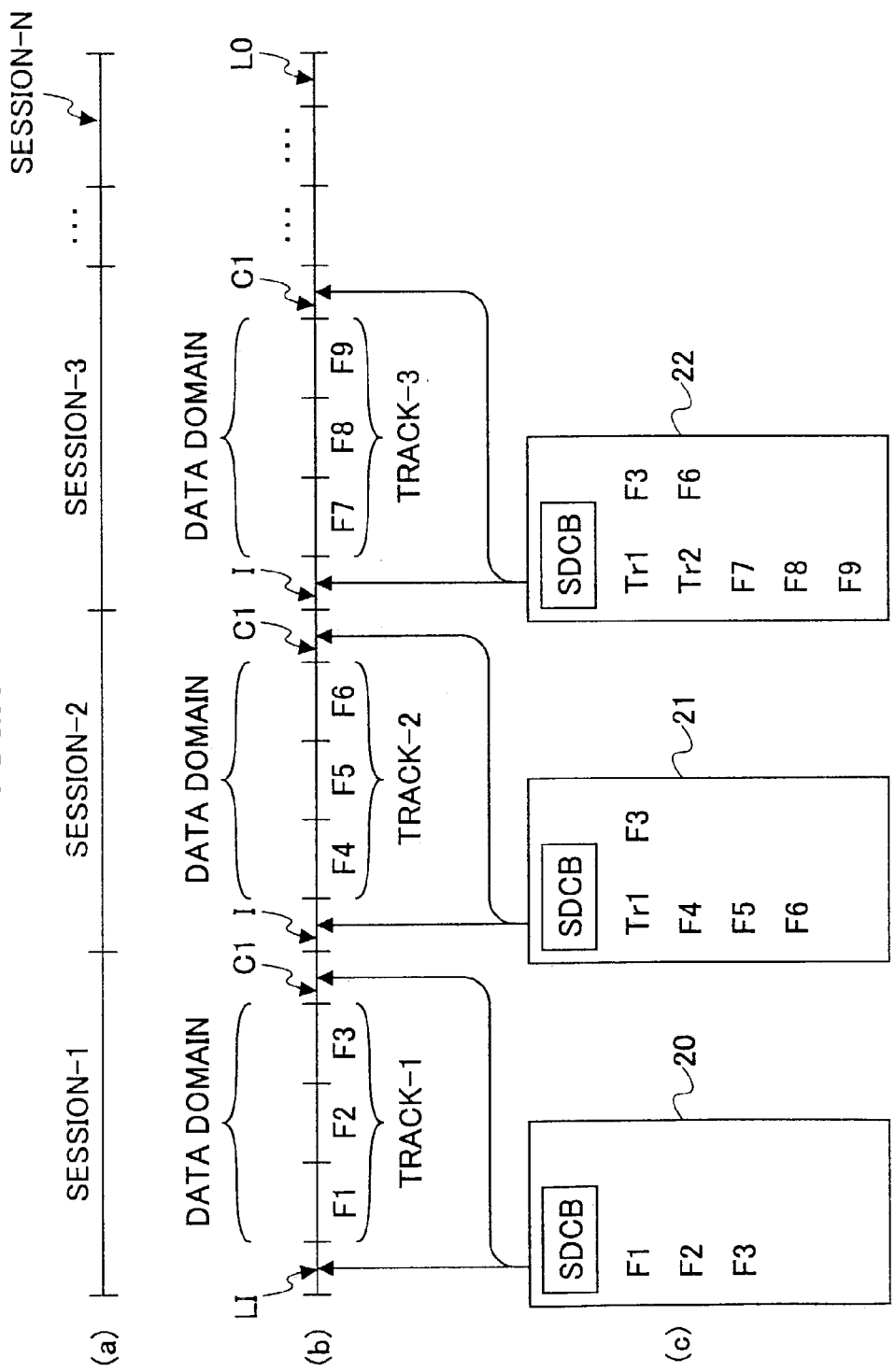
FIG. 3 is a diagram showing details of the format shown in FIG. 2.

FIG. 3 shows details of the data recording format of the information recording/reproducing system of the present invention. Here, an example is explained, wherein a multi-session data recording method is used by the data recording format of the optical disk 11. A plurality of sessions, session-1 through session-N (N: natural number), are present in the recording zone of the optical disk 11 (refer to (a) of FIG. 3). Session-1 consists of a lead-in (LT) zone, a data (Data) zone, and a closure (Cl) zone in this sequence. The data zone further consists of a plurality of fragments, three fragments F1, F2, and F3 in this example. The data zone forms a track 1.

Further, session-2 consists of an introductory (I) zone, a data zone, and a closure zone, and the data zone further consists of three fragments F4, F5, and F6. The data zone forms a track 2. Furthermore, session-3 consists of an introductory zone, a data zone, and a closure zone, similar to session-2, and the data zone further consists of three fragments F7, F8, and F9. The data zone forms a track 3. The plurality of sessions are formed in this manner, with the last session-N consisting of an introductory zone, a data zone, and a lead-out (LO) zone (refer to (b) of FIG. 3).

A buffer zone is prepared in each of the lead-in zone, the introductory zones, the closure zones, and the lead-out zone. In the buffer zone, a session disk control block (SDCB) is prepared, the SDCB storing the management information for each session, such as an address of each fragment of the session and an address of the track of the preceding session In the information recording/reproducing system of the present embodiment, fragment information that is the greatest serial fragment number of a session is attached to a fragment table, such as a fragment table 21, that contains the management information of the next session.

For example, in the buffer zone of the lead-in zone and the closure zone of session-1, a fragment information table 20 is prepared as SDCB for storing the addresses of the fragments F1, F2, and F3 of session-1. In the buffer zone of the introductory zone and the closure zone of session-2, a fragment information table 21 is prepared as SDCB for storing the greatest fragment number F3 of session-1, corresponding to the address of track-1 Tr1 of session-1, in addition to the addresses of the fragments F4, F5, and F6 of session-2. Furthermore, in the buffer zone of the introductory zone and the closure zone of session-3, a fragment information table 22 is prepared as SDCB for storing the greatest fragment number F3 of session-1, corresponding to the address of track-1 Tr1, and the greatest fragment number F6 of session-2, corresponding to the address of track-2 Tr2, in addition to the addresses of the fragments F7, F8, and F9 of session-3 (refer to (c) of FIG. 3).

Alternatively, the smallest of the serial numbers that are assigned to the fragments may be recorded in the fragment information table, instead of the greatest fragment number. In this case, in the buffer zone of the introductory zone and the closure zone of session-2, a fragment information table 21 is prepared as SDCB for storing the smallest fragment number F1 of session-1, corresponding to the address of track-1 Tr1 of session-1, in addition to the addresses of the fragments F4, F5, and F6 of session-2. Furthermore, in the buffer zone of the introductory zone and the closure zone of session-3, a fragment information table 22 is prepared as SDCB for storing the smallest fragment number F1 of session-1, corresponding to the address of track-1 Tr1, and the smallest fragment number F4 of session-2, corresponding to the address of track-2 Tr2, in addition to the addresses of the fragments F7, F8, and F9 of session-3.

In this manner, the start position of a session coincides with the start position of a fragment, which facilitates searching for and locating a desired address. As described, when data recording of the session is completed based on the largest recording unit, fragment information that is based on a smaller recording unit is also included. At that time, the greatest fragment number, or alternatively, the smallest fragment number, of the fragment serial numbers of the preceding session, and a part of fragment information (such as ID, a start address, and length) are recorded. The greatest fragment number or the smallest fragment number recorded in the fragment information table is used for searching for and reproducing the desired data at high speed. Details of the reproducing processing are described below.

Above, the case wherein two levels of recording units are specified as the plurality of recording units is explained, namely, the largest recording unit and the fragment recording unit that is defined as a recording unit smaller than the largest recording unit. In preparation for future developments, an information area for storing information about a third recording unit may be additionally provided in the fragment information table. This is to obtain even higher speed access means that may become available in the future. The optical disk arranged in the manner as described above can be mounted, that is, become ready to start reproducing a desired unit, at a high speed, and data reproduction can be quickly carried out.

Figure 4:
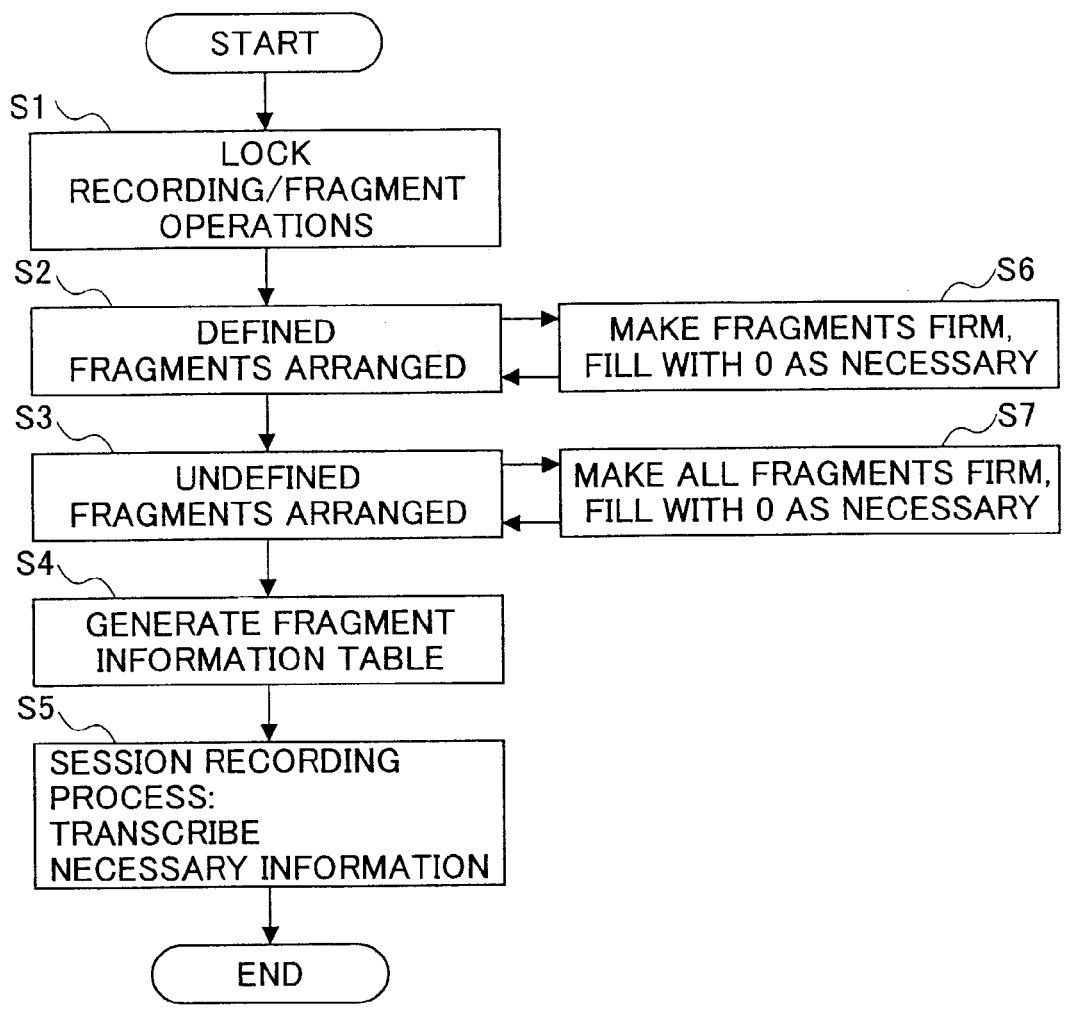
FIG. 4 is a flowchart showing a data recording process of the information recording/reproducing system shown in FIG. 1.

FIG. 4 is a flowchart showing the data recording process of the information recording and reproducing system, using an optical disk, of the present invention. First, the controller 9 carries out a locking process, step S1, immediately after the data recording starts, such that recording and fragment operations that change the data by interruption from other applications are inhibited until the subsequent operations are completed. Next, at step S2, the status of data recording units of a session is checked, and defined fragment information is arranged. If data recording of the fragment is not completed, the process proceeds to step S6, where the fragment is made firm, and if necessary, zeroes are added (compulsory zero recording).

Then, at step S3, the status of data recording units is determined, and undefined fragment information is arranged. If data recording of the fragment is not completed, the fragment is made firm at step S7, and if necessary, zeroes are added (compulsory zero recording), such that all the fragments are made firm. This process is necessary because there are information reproducing apparatuses that cannot operate if there is a part that bears no recording. For this reason, the same recording process is performed on the defined and undefined recording units. By processing so far, all fragment information is completed. At step S4, a fragment information table is generated, wherein the greatest fragment number, or alternatively, the smallest fragment number, of the serial numbers of a session is stored, the serial numbers being uniquely assigned in an ascending order to each fragment. At step S5, as the entire session recording process is completed, only required information contained in the fragment information table is transcribed to a higher ranking structure, the session is finalized, the session is closed, and this data recording process is completed.

Figure 5:
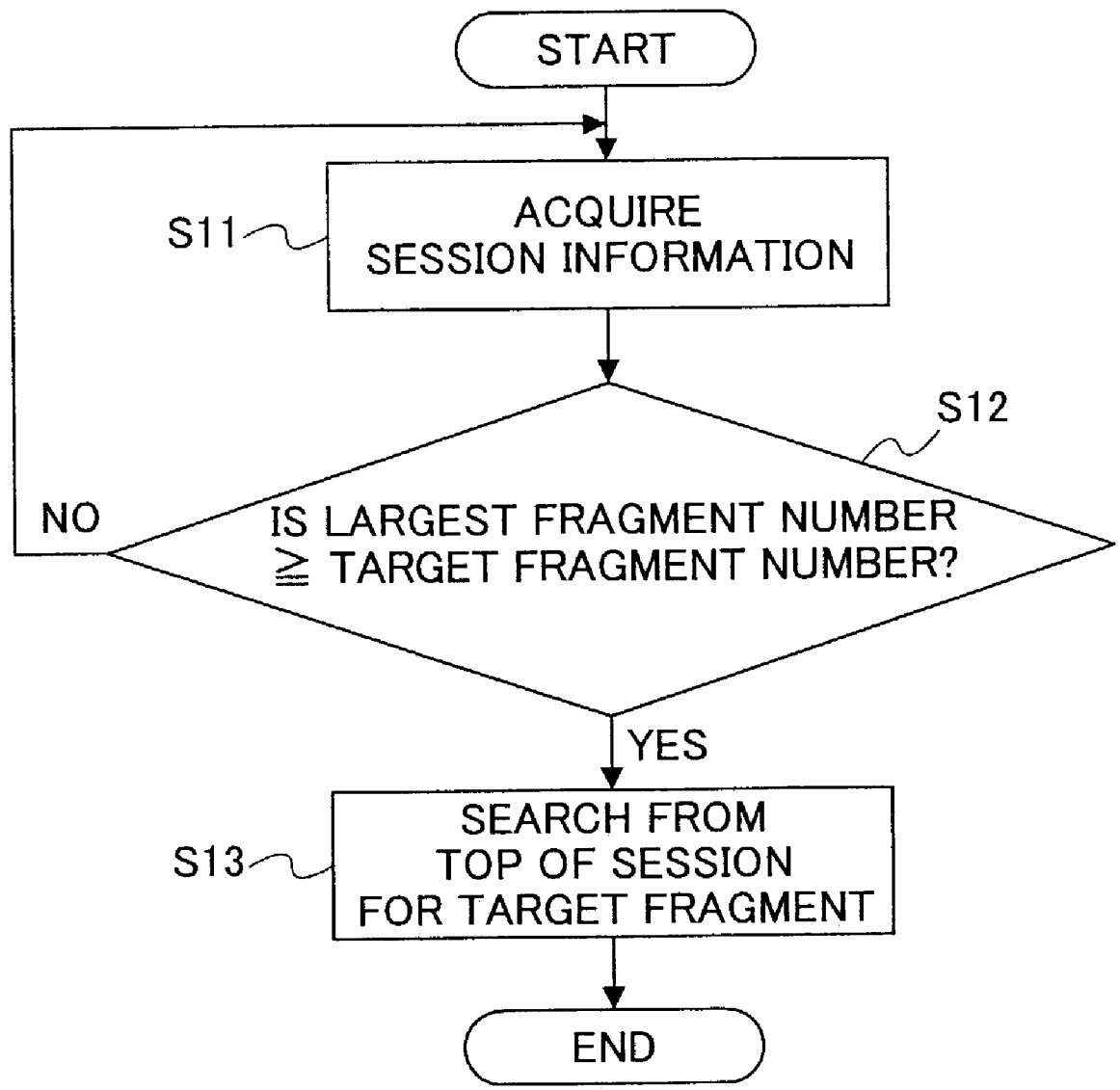
FIG. 5 is a flowchart showing a data reproducing process of the information recording/reproducing system shown in FIG. 1.

Next, the reproducing process of the present invention is explained, the process being for reproducing the data that are recorded on the optical disk by the optical disk recording and reproduction system, as mentioned above. FIG. 5 is a flowchart showing the data reproducing process of the information recording and reproducing system of the present invention. FIG. 5 shows a means for searching for fragments at high speed. When a fragment number for reproduction (desired fragment that is the target fragment to be reproduced) is received from the host computer 12, the controller 9 acquires the session information stored in the session information table (the greatest fragment number of the fragment of a session). Then, the controller 9 repeats a process wherein the greatest fragment number of a session is compared with the target fragment number for reproduction at step S11 and step S12, the comparison process being sequentially carried out from the sesson-1 and upward. When it is determined that the greatest fragment number of a fragment of a session is equal to or greater than the target fragment number, the target fragment is searched for from the top of the session where the greatest fragment number is found to be equal to or greater than the target fragment number. The data of the target fragment searched for in this manner are read, and transmitted to the host computer, and the data reproducing process is completed.

For example, when reproducing the data of the fragment F5 of the optical disk 11 that is formatted as shown in FIGS. 2 and 3, the controller 9 first refers to the fragment information table 20 of session-1. Since there are no greatest fragment numbers stored in the fragment information table 20 of session-1, the controller 9 checks the fragment information table 21 of session-2, where the fragment number F3 (the greatest fragment number of track-1) is stored, corresponding to the address of track-1 Tr1. The controller 9 acquires the greatest fragment number F3, and compares the F3 with the fragment number F5 that is the target fragment number. Since the greatest fragment number F3 is smaller than the target fragment number F5, the next session is checked. The fragment number F6 (the greatest fragment number of track-2), corresponding to the address of track-2 Tr2 is found in the fragment information table 22 of session 3. The greatest fragment number F6 is compared with the target fragment number F5. Since the greatest fragment number F6 is equal to or greater than the target fragment number F5, search is started from the top of track-2 of session-2, where the top fragment number is F4, and the fragment F5 is found. Thus, since what is necessary is to search for only the track in which the target fragment is contained, data reproduction of the optical disk in which a plurality of levels of data recording units are provided can be performed at high speed.

The data reproducing process in the case that the smallest fragment number of a session is stored in the fragment information table, which is as shown in FIG. 3, differs slightly from the previous case that considers the greatest fragment number of the session. For example, the smallest fragment number F1 of session-1 is stored corresponding to the address of the track Tr1 of the fragment information table 21, which is as shown in FIG. 3. The smallest fragment number F4 of session-2 is stored corresponding to the address of track Tr2 of the fragment information table 22. Similarly, the smallest fragment number F7 of session-3 is stored corresponding to the address of track Tr3 of the following fragment information table 23 that is not illustrated for the following session-4 that is not illustrated. When the data in fragment F5 of the optical disk 11 are the target data to be reproduced, the controller 9 first checks the fragment information table 20 with reference to session-1, and finds no smallest fragment numbers stored therein. Then, the controller 9 searches the fragment information table 21 of session-2, and finds the smallest fragment number F1 at the place corresponding to track Tr1, and obtains the smallest number F1. The controller 9 compares the smallest fragment number F1 with the target fragment number F5, determines that the smallest fragment number F1 is smaller than the target fragment number F5, and proceeds to search the next fragment information table. From the next fragment information table 22 of session-3, the smallest fragment number F4 is found at the place corresponding to track Tr2, and the F4 is obtained. The comparison by the controller 9 still shows that the smallest fragment number F4 is smaller than the target frame number F5.

Then, the controller 9 checks the following fragment information table 23 of the following session-4, wherein the smallest fragment number F7 is stored at a place that corresponding to track-3 Tr3 (not illustrated). The controller 9 finds and obtains F7; compares F7 with the target fragment number F5; and determines that F7 is equal to or greater than F5. Then, the controller 9 returns to session-2, that is, two sessions back. Searching of session-2, wherein the top fragment number is F4, is started, and the fragment F5 is found. Thus, the session containing the target fragment can be found quickly through a smaller number of access attempts, without searching inside of all the sessions.

According to the information recording apparatus, the information recording method, and the information recording/reproducing system of the present invention, access information relative to a smaller (lower-level) recording unit is included in the largest (the highest-level) recording unit, when recording data on an information recording medium, as explained above, such that high-speed access can be performed with a simple process. Further, according to the information reproducing apparatus of the present invention, the data are reproducible at high speed through a simple process from the information recording medium, on which the data are recorded by the information recording apparatus, the information recording method, and the information recording/reproducing system of the present invention. Furthermore, according to the program and the recording medium of the present invention, a computer can be easily made to realize the data recording function according to the present invention.

Further, the present invention is not limited to these embodiments, but various variations and modifications may be made without departing from the scope of the present invention.

The present application is based on Japanese priority application No. 2002-176179 filed on Jun. 17, 2003 with the Japanese Patent Office, the entire contents of that are hereby incorporated by reference.

What is claimed is:

1. An in formation recording apparatus for recording data on a recordable information recording medium comprising:
   a plurality of highest level recording units sequentially, each of said highest level recording units including lower level recording units, each of said lower level recording units having an assigned serial number;
   serial number assigning means for assigning said assigned serial number in an ascending order to each of said lower level recording units when completing data recording in said highest level recording unit;
   greatest number recording means for recording the greatest said assigned serial number as management information of a next highest level recording unit, said management information being created separately for each of said plurality of highest level recording units; and
   search means for narrowing down and searching for a desired piece of the data based on the greatest said assigned serial number of the lower level recording units in the highest level recording unit.

2. An information recording apparatus for recording data on a recordable information recording medium comprising:
   a plurality of highest level recording units sequentially, each of said highest level recording units including lower level recording units, each of said lower level recording units having an assigned serial number;
   serial number assigning means for assigning said assigned serial number in an ascending order to each of said lower level recording units when completing data recording in said highest level recording unit;
   smallest number recording means for recording the smallest said assigned serial number as management information of a next highest level recording unit, said management information being created separately for each of said plurality of highest level recording units; and
   search means for narrowing down and searching for a desired piece of the data based on the smallest said assigned serial number of the lower level recording units in the highest level recording unit.

3. An information recording apparatus as claimed in claim 1, wherein said recordable information recording medium is a DVD+R disk.

4. An information recording apparatus as claimed in claim 1, wherein a session serves the highest level recording unit, and a fragment serves the lower level recording unit.

5. An information reproducing apparatus for reproducing said data recorded on said recordable information recording medium, comprising:
   a plurality of highest level recording units sequentially, each of said highest level recording units including lower level recording units, each of said lower level recording units having an assigned serial number;
   serial number assigning means for assigning said assigned serial number in an ascending order to each of said lower level recording units when completing data recording in said highest level recording unit;
   greatest number recording means for recording the greatest said assigned serial number as management information of a next highest level recording unit, said management information being created separately for each of said plurality of highest level recording units; and
   search means for narrowing down and searching for a desired piece of the data based on the greatest said assigned serial number of the lower level recording units in the highest level recording unit.

6. An information reproducing apparatus for reproducing said data recorded on said recordable information recording medium comprising:
   a plurality of highest level recording units sequentially, each of said highest level recording units including lower level recording units, each of said lower level recording units having an assigned serial number;
   serial number assigning means for assigning said assigned serial number in an ascending order to each of said lower level recording units when completing data recording in said highest level recording unit;
   smallest number recording means for recording the smallest said assigned serial number as management information of a next highest level recording unit, said management information being created separately for each of said plurality of highest level recording units; and
   search means for narrowing down and searching for a desired piece of the data based on the smallest said assigned serial number of the lower level recording units in the highest level recording unit.

7. An information recording method for recording data on a recordable information recording medium, said method comprising:
   assigning a serial number in an ascending order to each of a plurality lower level recording units when completing data recording in a highest level recording unit, where said plurality of lower level recording units are within a highest level recording unit;
   recording the greatest said assigned serial number as management information of a next highest level recording unit, said management information being created separately for said highest level recording unit; and
   narrowing down and searching for a desired piece of the data based on the greatest said assigned serial number of the plurality of lower level recording units in the highest level recording unit.

8. A system comprising a computer-executable program, said program causing the system to perform the acts of recording data on a recordable information recording medium, said acts comprising:
   assigning a serial number in an ascending order to each of a plurality of lower level recording units when completing data recording in a highest level recording unit, where said plurality of lower level recording units are within a highest level recording unit;
   recording the greatest said assigned serial number as management information of a next highest level recording unit, said management information being created separately for said highest level recording unit; and
   narrowing down and searching for a desired piece of the data based on the smallest said assigned serial number of the plurality of lower level recording units in the highest level recording unit.

9. A computer-readable recording medium for storing the computer-executable program for recording data on a recordable information recording medium comprising:

a plurality of highest level recording units sequentially, each of said highest level recording units including lower level recording units, each of said lower level recording units having an assigned serial number;

serial number assigning means for assigning said assigned serial number in an ascending order to each of said lower level recording units when completing data recording in said highest level recording unit;

greatest number recording means for recording the greatest said assigned serial number as management information of a next highest level recording unit, said management information being created separately for each of said plurality of highest level recording units; and search means for narrowing down and searching for a desired piece of the data based on the greatest said assigned serial number of the lower level recording units in the highest level recording unit.

10. An information recording/reproducing system comprising:

a host computer, and an information recording apparatus for recording data on a recordable information recording medium comprising:

a plurality of highest level recording units sequentially, each of said highest level recording units including lower level recording units, each of said lower level recording units having an assigned serial number;

serial number assigning means for assigning said assigned serial number in an ascending order to each of said lower level recording units when completing data recording in said highest level recording unit;

greatest number recording means for recording the greatest said assigned serial number as management information of a next highest level recording unit, said management information being created separately for each of said plurality of highest level recording units; and search means for narrowing down and searching for a desired piece of the data based on the greatest said assigned serial number of the lower level recording units in the highest level recording unit.

* * * * *